(12) United States Patent
Welsh et al.

(10) Patent No.: US 11,858,621 B2
(45) Date of Patent: Jan. 2, 2024

(54) HARMONIC CONTROL ACTUATOR FOR AIRCRAFT

(71) Applicant: Lockheed Martin Corporation, Bethesda, MD (US)

(72) Inventors: William A. Welsh, North Haven, CT (US); Jason A. Satira, Derby, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 83 days.

(21) Appl. No.: 17/582,853

(22) Filed: Jan. 24, 2022

(65) Prior Publication Data

US 2023/0286648 A1 Sep. 14, 2023

(51) Int. Cl.
| | |
|---|---|
| *B63H 5/08* | (2006.01) |
| *B64C 27/605* | (2006.01) |
| *B64C 27/64* | (2006.01) |
| *F16H 1/32* | (2006.01) |
| *B64C 27/12* | (2006.01) |
| *B64D 45/00* | (2006.01) |

(52) U.S. Cl.
CPC ............ *B64C 27/605* (2013.01); *B64C 27/12* (2013.01); *B64C 27/64* (2013.01); *F16H 1/32* (2013.01); *B64D 2045/0085* (2013.01); *F16H 2001/323* (2013.01)

(58) Field of Classification Search
CPC . B64C 27/605; B64C 27/72; B64C 2027/004; B64C 27/001
USPC ....................................................... 416/112
See application file for complete search history.

(56) References Cited

U.S. PATENT DOCUMENTS

| | | | |
|---|---|---|---|
| 7,958,801 B2 | 6/2011 | Frederickson | |
| 7,988,089 B2 | 8/2011 | Wittmer | |
| 9,452,828 B2 | 9/2016 | Heverly et al. | |
| 10,906,636 B2 | 2/2021 | Welsh et al. | |
| 11,407,505 B2* | 8/2022 | Gallagher, V | ........ B64C 27/605 |
| 2008/0111399 A1* | 5/2008 | Zierten | .................. B64C 27/605 296/210 |
| 2008/0279685 A1* | 11/2008 | Kessler | .................. B64C 27/001 416/31 |
| 2014/0034779 A1* | 2/2014 | Fenny | ..................... B64C 27/72 416/1 |
| 2021/0163128 A1* | 6/2021 | Stamps | ............... B64C 29/0033 |

* cited by examiner

*Primary Examiner* — Long T Tran
*Assistant Examiner* — James J Kim
(74) *Attorney, Agent, or Firm* — Michael Best & Friedrich LLP

(57) ABSTRACT

A rotary blade aircraft includes an airframe, a rotor shaft driven about a rotor axis, and a plurality of rotor blades driven by the rotor shaft about the rotor axis. The rotary blade aircraft includes a swashplate assembly coupled to the plurality of rotor blades. The swashplate assembly is operable to move the plurality of rotor blades about a respective longitudinal axis. The rotary blade aircraft includes a hydraulic control servo coupled between the airframe and the swashplate assembly. The hydraulic control servo is operable to move the swashplate assembly relative to the rotor axis. The rotary blade aircraft includes a harmonic control actuator coupled between the airframe and the swashplate assembly. The harmonic control actuator is operable independently relative to the hydraulic control servo to move the swashplate assembly relative to the rotor axis to reduce vibration at selected frequencies in the airframe.

20 Claims, 8 Drawing Sheets

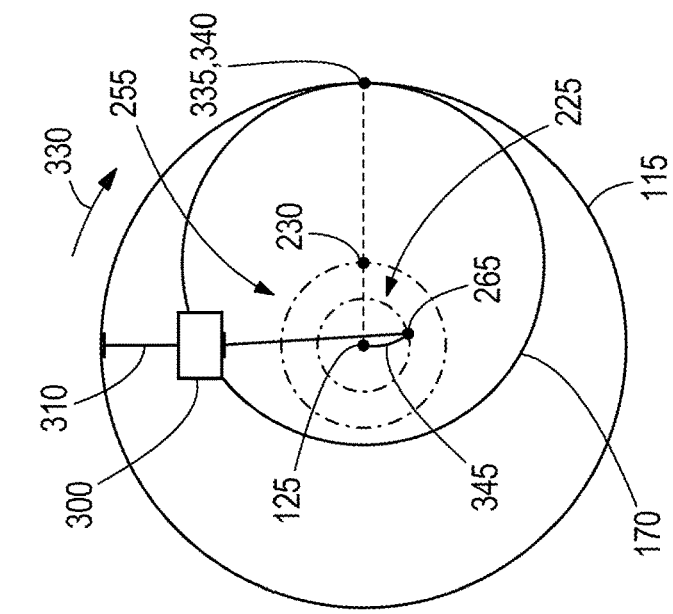
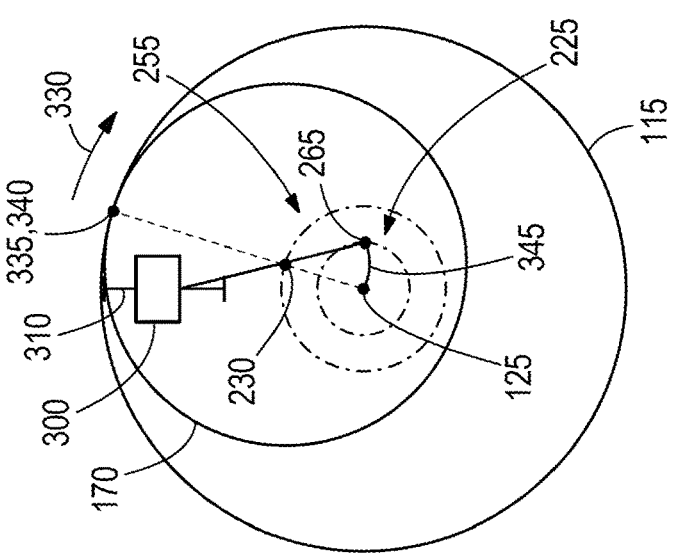
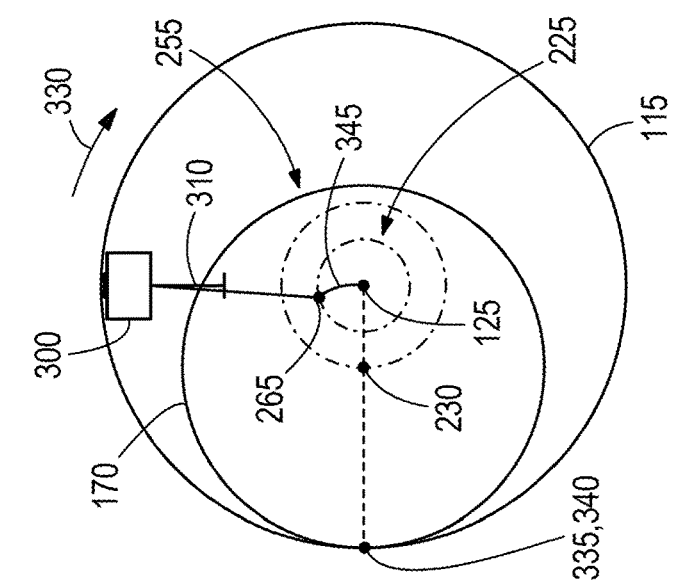

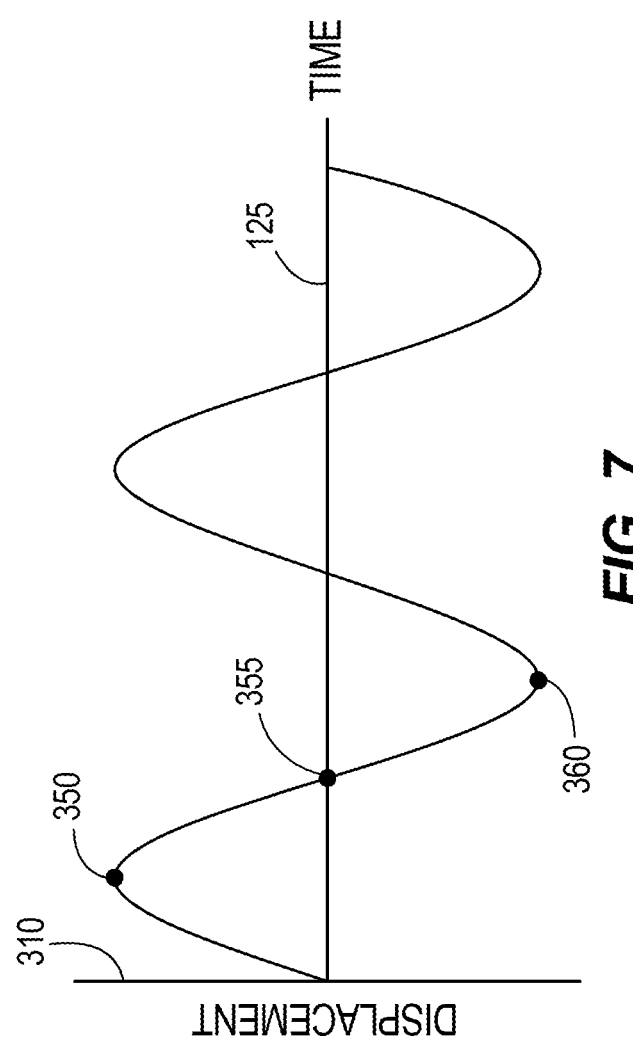

HARMONIC CONTROL ACTUATOR FOR AIRCRAFT

FIELD OF THE DISCLOSURE

The present disclosure relates to a harmonic control actuator for an aircraft and, in particular, to a harmonic control actuator that reduces vibrations of a helicopter during flight.

SUMMARY

In one aspect, a rotary blade aircraft includes an airframe, a rotor shaft driven about a rotor axis relative to the airframe, and a plurality of rotor blades coupled to the rotor shaft to be driven by the rotor shaft about the rotor axis. Each rotor blade has a longitudinal axis. The rotary blade aircraft includes a swashplate assembly coupled to the plurality of rotor blades. The swashplate assembly is operable to move the plurality of rotor blades about the respective longitudinal axis. The rotary blade aircraft includes a hydraulic control servo coupled between the airframe and the swashplate assembly. The hydraulic control servo is operable to move the swashplate assembly relative to the rotor axis. The rotary blade aircraft includes a harmonic control actuator coupled between the airframe and the swashplate assembly. The harmonic control actuator is operable independently relative to the hydraulic control servo to move the swashplate assembly relative to the rotor axis to reduce vibration at selected frequencies in the airframe.

In another aspect, a harmonic control actuator for a rotary blade aircraft includes a housing, an electric motor coupled to the housing, a ring gear supported within the housing, and a planetary gear engageable with the ring gear. The planetary gear includes an eccentric sleeve. The harmonic control actuator includes a crankshaft at least partially received within the eccentric sleeve. The crankshaft is driven by the electric motor to drive the planetary gear. The harmonic control actuator includes an output member coupled to the eccentric sleeve to be driven along an output path. The output member is configured to move a swashplate assembly of the rotary blade aircraft to reduce vibrations of the rotary blade aircraft during flight.

In yet another aspect, a control assembly is configured to reduce vibration at selected frequencies of an aircraft. The control assembly includes a sensor configured to be coupled to an airframe of the aircraft. The sensor is configured to measure vibrations of the airframe during flight. The control assembly also includes a control processor in communication with the sensor. The control processor is configured to receive a signal from the sensor representing measured vibrations of the airframe during flight, determine a desired movement of at least one of a plurality of rotor blades of the aircraft based on the signal from the sensor, and control an electric motor of a harmonic control actuator coupled to a swashplate assembly of the aircraft to provide the desired movement of the at least one of the plurality of rotor blades to reduce the measured vibrations in the airframe.

Other aspects will become apparent by consideration of the detailed description and accompanying drawings.

BRIEF DESCRIPTION OF THE DRAWINGS

FIGS. 6A-6C illustrate a sequence of operation of the harmonic control actuator of FIG. 3 when the harmonic control actuator is in a first mode of operation.
FIG. 7 illustrates an output displacement of the harmonic control actuator when in the first mode of operation shown in FIGS. 6A-6C.

DETAILED DESCRIPTION

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. Terms of degree, such as "substantially," "about," "approximately," etc. are understood by those of ordinary skill to refer to reasonable ranges outside of the given value, for example, general tolerances associated with manufacturing, assembly, and use of the described embodiments. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, and the like.

It should be noted that a plurality of hardware and software based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

Figure 1:
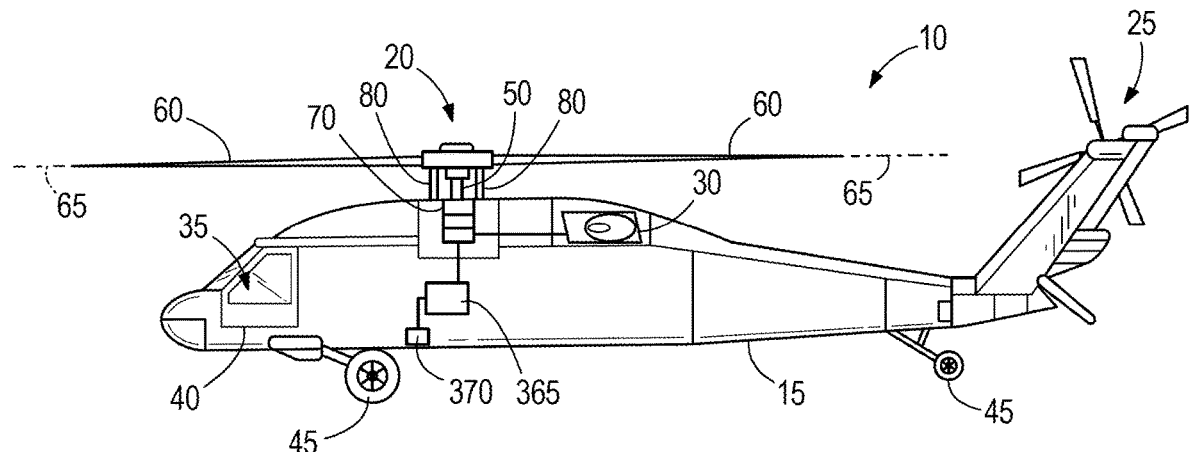
FIG. 1 illustrates a rotary blade aircraft.

FIG. 1 illustrates an embodiment of a rotary blade aircraft (e.g., a helicopter 10). The helicopter 10 includes an airframe 15 supporting a main rotor assembly 20 and a tail rotor assembly 25. The main rotor assembly 20 and the tail rotor assembly 25 are driven by a power source, for example, one or more engines 30. Operation of the main rotor assembly 20, the tail rotor assembly 25, and the engines 30 are controlled by flight controls 35 located within a cockpit 40 of the helicopter 10. Additionally, the helicopter 10 includes landing gear assemblies extending below the airframe 15 to support the helicopter 10 on a surface when not in flight. While shown in the context of a helicopter 10 with a single main rotor assembly 20 and tail rotor assembly 25, aspects of the disclosure can be used in other aircraft, including coaxial rotorcraft having propulsors, as well as fixed wing aircraft.

Figure 2:
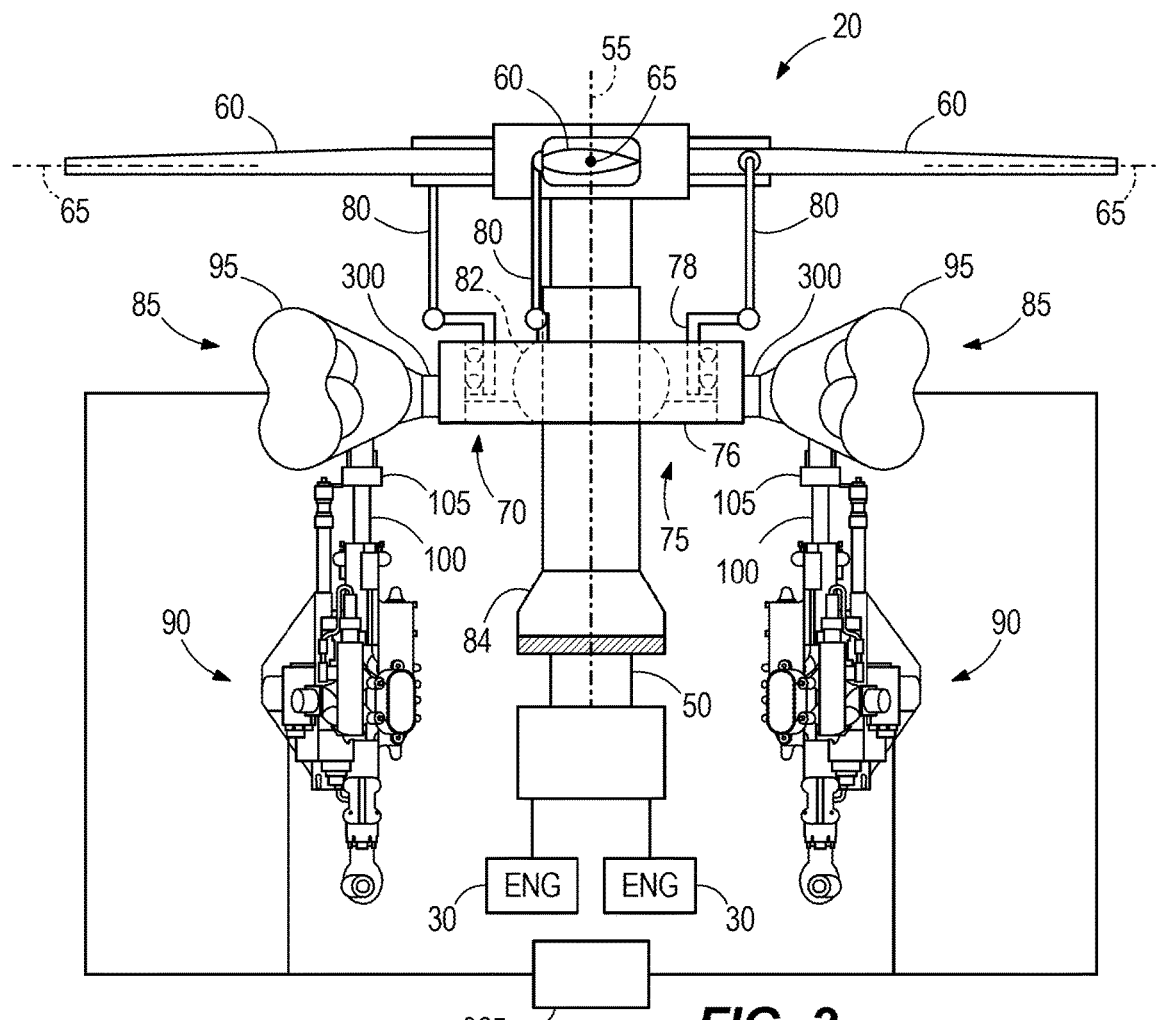
FIG. 2 is a schematic illustration of harmonic control actuators according to one embodiment coupled between hydraulic control servos and a swashplate assembly of the rotary blade aircraft of FIG. 1.

With reference to FIGS. 1 and 2, the main rotor assembly 20 includes a main rotor shaft 50 that is driven by at least one of the engines 30 about a main rotor axis 55. In turn, the main rotor shaft 50 drives rotor blades 60 about the main rotor axis 55. Each of the rotor blades has a longitudinal axis 65 extending radially from the main rotor axis 55. In the illustrated embodiment, the main rotor assembly 20 includes four rotor blades 60; however, in other embodiments, the main rotor assembly 20 can include two or three rotor blades 60 or more than four rotor blades 60. In addition, each of the rotor blades 60 is pivotable about their longitudinal axis 65 by a swashplate assembly 70. The swashplate assembly 70 includes a control ring subassembly 75 positioned around the main rotor shaft 50. The illustrated control ring subassembly 75 includes an outer member 76 and an inner member 78 that are coupled to a uniball joint 82 that is slidable along a fixed sleeve 84 positioned around a portion of the main rotor shaft 50.

In particular, the outer member 76 does not rotate about the main rotor shaft 50 but can translate along the main rotor shaft 50 (e.g., along the fixed sleeve 84) and/or change angles relative to the main rotor shaft 50 (e.g., via the uniball joint 82). The inner member 78 is rotatable about the main rotor shaft 50 relative to the outer member 76 and moves with the outer member 76 as the outer member 76 translates along the main rotor shaft 50 and/or changes angles relative to the main rotor shaft 50. Linkages 80 are coupled between the inner member 78 and the rotor blades 60. In the illustrated embodiment, the outer member 76 is coupled to harmonic control actuators 85, and the harmonic control actuators 85 are coupled to hydraulic control servos 90. In other words, the harmonic control actuators 85 are in series between the hydraulic control servos 90 and the swashplate assembly 70. In the illustrated embodiment, each hydraulic control servo 90 is associated with one harmonic control actuator 85. Accordingly, the harmonic control actuators 85 and the hydraulic control servos 90 do not rotate with the inner member 78 of the control ring subassembly 75 and the rotor blades 60 about the main rotor axis during operation of the helicopter 10. In other embodiments, the hydraulic control servos 90 can be coupled between the control ring subassembly 75 and the harmonic control actuators 85.

Figure 3:
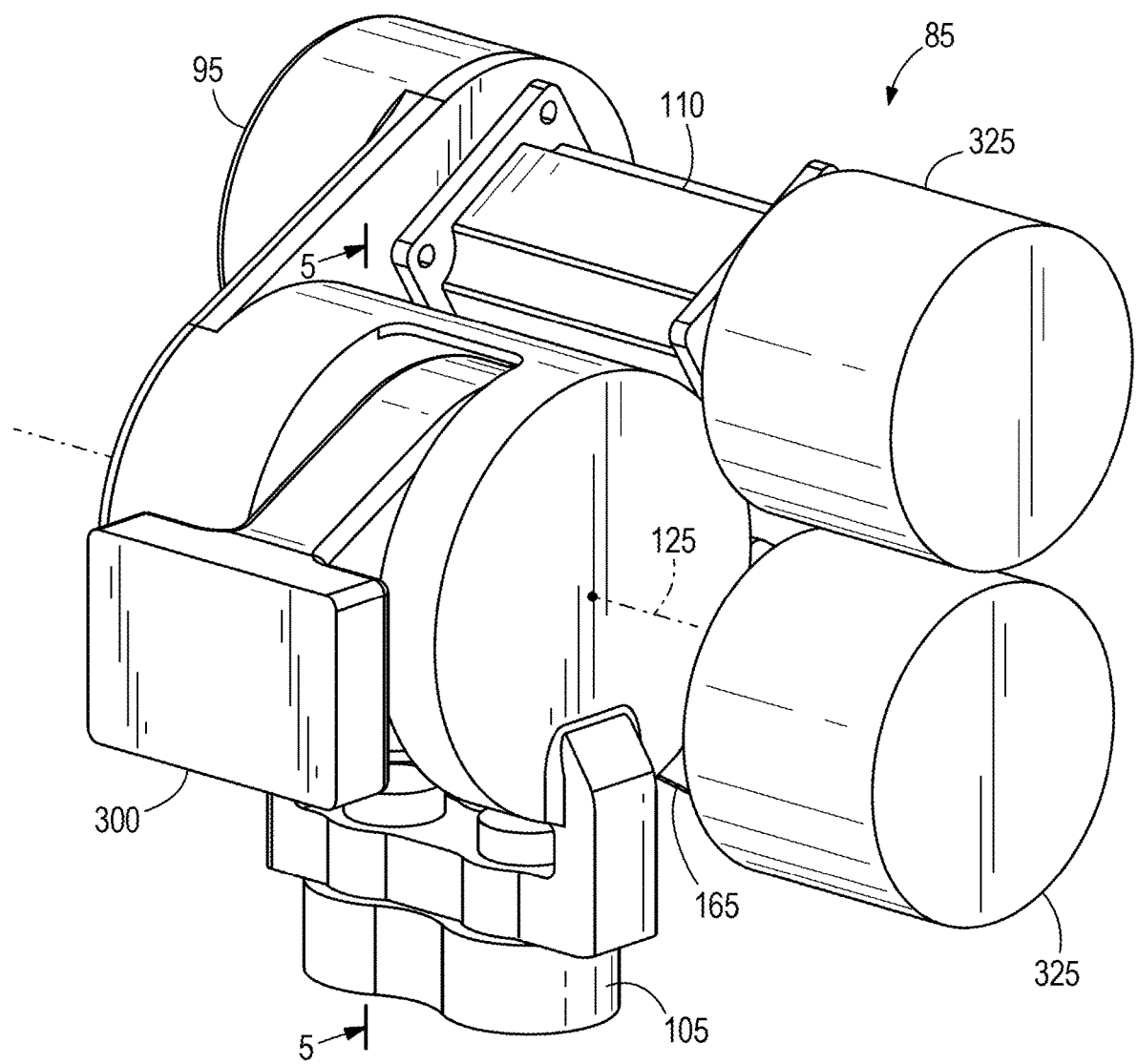
FIG. 3 is a perspective view of a harmonic control actuator of FIG. 2.
Figure 4:
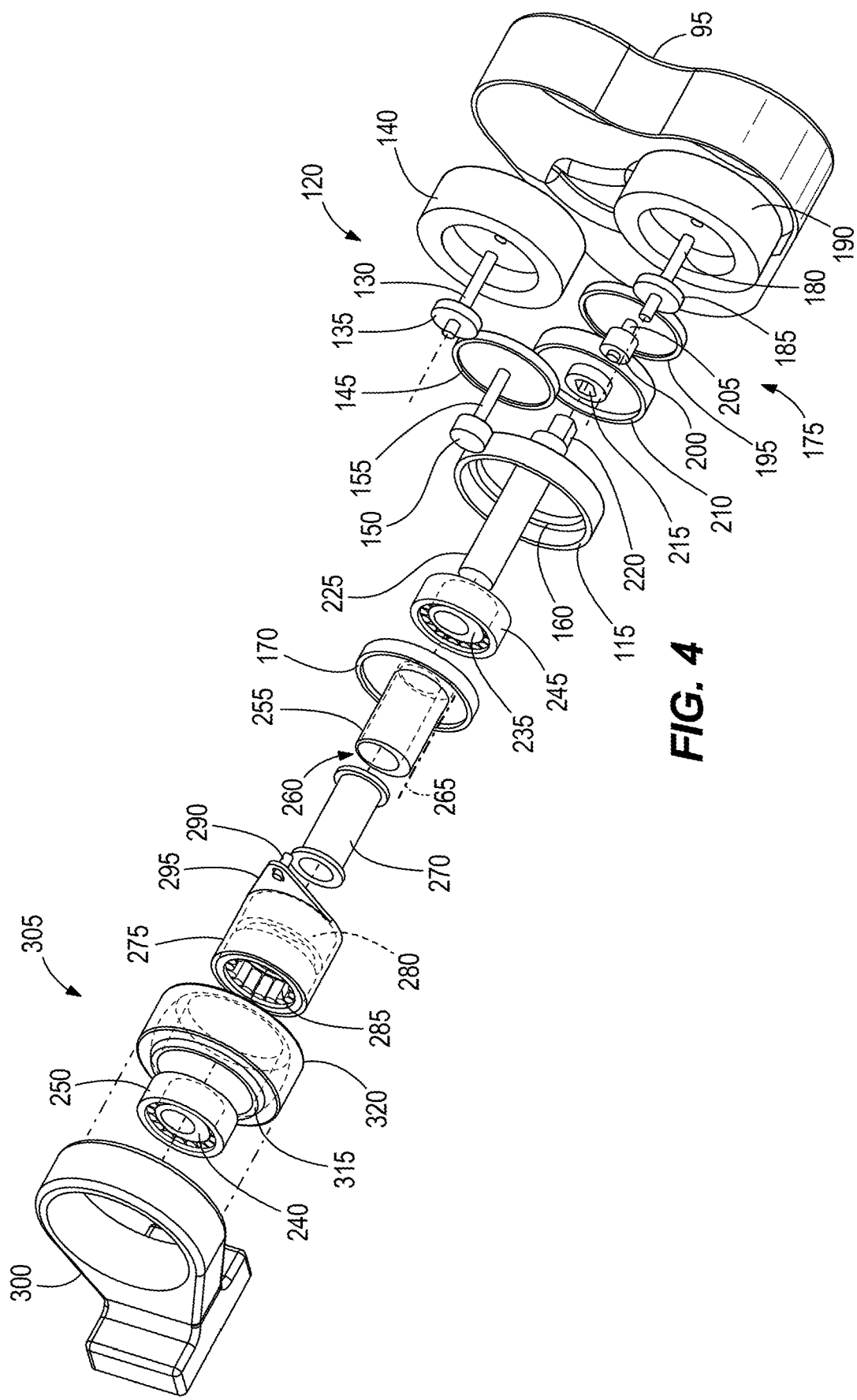
FIG. 4 is an exploded view of a portion of the harmonic control actuator of FIG. 3.

Each illustrated harmonic control actuator 85 includes similar components and functions in a similar way. As such, one harmonic control actuator 85 is discussed below but is applicable to the other harmonic control actuators 85. With reference to FIGS. 2 and 3, the illustrated harmonic control actuator 85 includes a housing 95 coupled to a moveable piston 100 of the corresponding hydraulic control servo 90 by a mount 105. With reference to FIGS. 3 and 4, a first electric motor 110 is coupled to the housing 95 and is operable to drive a ring gear 115 about a rotational axis 125 via a first dual stage geartrain 120. The illustrated first geartrain 120 includes a first stage having a first shaft 130 that is coupled to the first electric motor 110, a first spur gear 135 coupled to the first shaft 130, and a first flywheel 140 also coupled to the first shaft 130. The first spur gear 135 is positioned between the first electric motor 110 and the first flywheel 140 in a direction along the first shaft 130. The first spur gear 135 engages a second stage of the first geartrain 120 that includes a second spur gear 145, which includes a larger diameter than the first spur gear 135, and a third spur gear 150 driven by the second spur gear 145 via a second shaft 155. The third spur gear 150 includes a smaller diameter than the first spur gear 135 and engages an outer surface of the ring gear 115 to drive the ring gear 115 about the rotational axis 125. The ring gear 115 is rotatably supported within the housing 95 by a ring gear bearing 160 (FIGS. 4 and 5) that engages an inner surface of the ring gear 115. The illustrated first geartrain 120 is a gear reduction system to increase torque produced from the first electric motor 110 to drive the ring gear 115.

Figure 5:
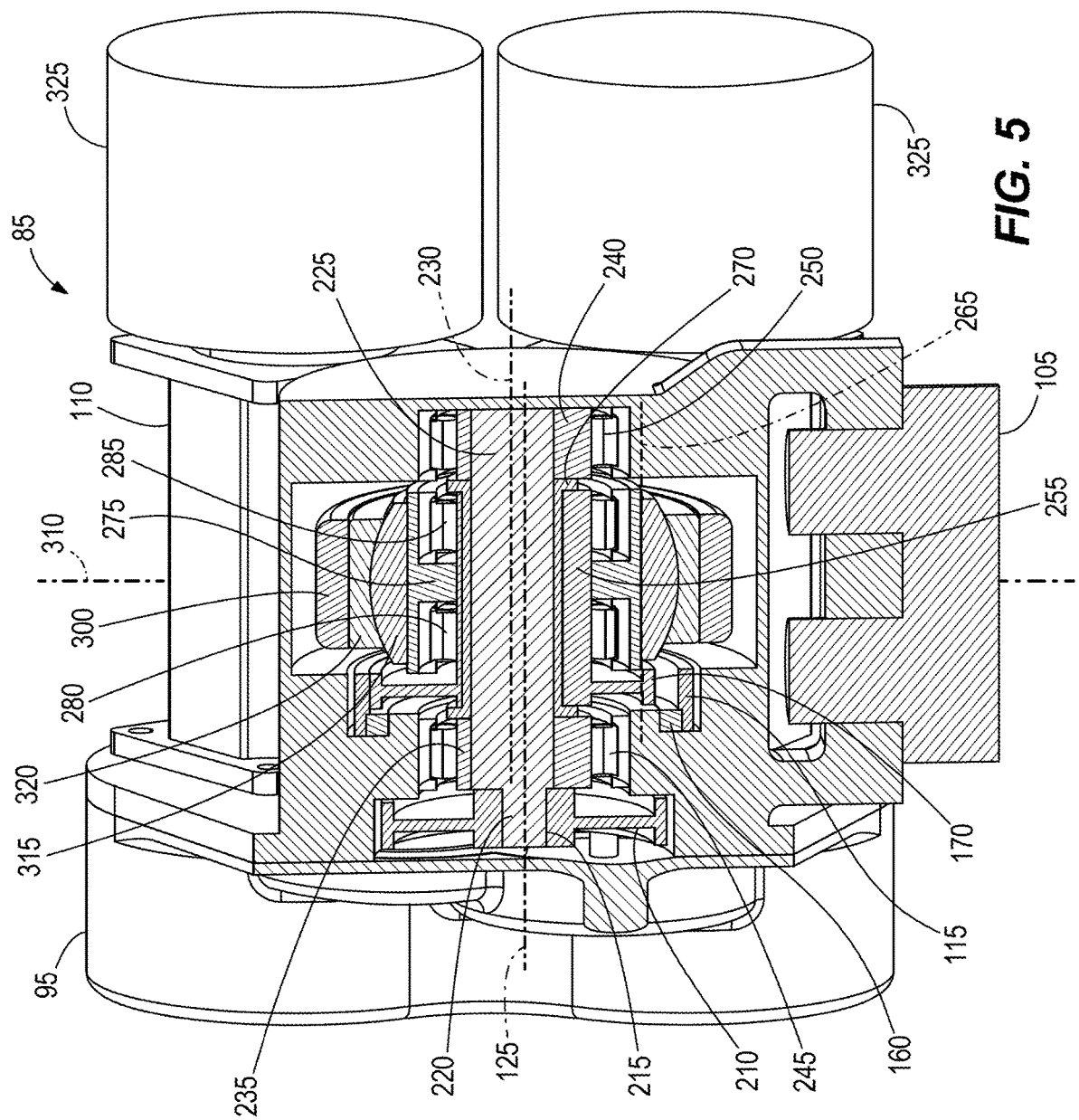
FIG. 5 is a cross sectional view of the harmonic control actuator of FIG. 3 taken along line 5-5.

With continued reference to FIGS. 3 and 4, a second electric motor 165 is also coupled to the housing 95 and is operable to drive a planetary gear 170 via a second dual stage geartrain 175. The illustrated planetary gear 170 engages the ring gear 115. The illustrated second geartrain 175 includes first stage having a third shaft 180 coupled to the second electric motor 165, a fourth spur gear 185 coupled to the third shaft 180, and a second flywheel 190 also coupled to the third shaft 180. The fourth spur gear 185 is positioned between the second electric motor 165 and the second flywheel 190 in a direction along the third shaft 180. The fourth spur gear 185 engages a second stage of the second geartrain 175 that includes a fifth spur gear 195, which includes a larger diameter than the fourth spur gear 185, and a sixth spur gear 200 driven by the fifth spur gear 195 via a fourth shaft 205. The sixth spur gear 200 includes a smaller diameter than the fourth spur gear 185 and engages a drive gear 210, which includes a diameter greater than the fifth spur gear 195. The drive gear 210 is driven about the rotational axis 125 and includes a keyed slot 215 that engages a keyed protrusion 220 of a crankshaft 225. As shown in FIG. 5, the crankshaft 225 has a central longitudinal axis 230 and the illustrated keyed protrusion 220 is positioned eccentrically relative to the central longitudinal axis 230. With reference to FIGS. 4 and 5, the crankshaft 225 is received through a first eccentric spacer 235, which is coupled to an end of the crankshaft 225 adjacent the keyed protrusion 220, and a second eccentric spacer 240, which is coupled adjacent the other end of the crankshaft 225. The first and second eccentric spacers 235, 240 are rotatably supported about the rotational axis 125 relative to the housing 95 by first and second roller bearings 245, 250. As such, the drive gear 210 drives the crankshaft 225 to revolve around the rotational axis 125 for the planetary gear 170 to maintain engagement with the ring gear 115. The crankshaft 225 is supported during this eccentric movement relative to the housing 95 by the first and second eccentric spacers 235, 240 and the first and second roller bearings 245, 250. The illustrated second geartrain 175 is a gear reduction system to increase torque produced from the second electric motor 165 to drive the planetary gear 170.

As shown in FIGS. 4 and 5, the illustrated planetary gear 170 includes an eccentric sleeve 255 having a bore 260 that receives the crankshaft 225. A central axis of the bore 260 is colinear with the central longitudinal axis 230 of the crankshaft 225. As such, the planetary gear 170 is rotatable about the central longitudinal axis 230 of the crankshaft 225. In addition, as the sleeve 255 is eccentric relative to the planetary gear 170, the eccentric sleeve 255 has an apex axis 265 on an outer surface of the eccentric sleeve 255 that defines the furthest axis of the outer surface of the eccentric sleeve 255 relative to the central longitudinal axis 230. The apex axis 265 is parallel to the central longitudinal axis 230. In addition, a crankshaft bushing 270 is positioned between the crankshaft 225 and the eccentric sleeve 255 to support movement of the planetary gear 170 about the central longitudinal axis 230. The illustrated eccentric sleeve 255 is coupled to a bearing support 275 by third and fourth roller bearings 280, 285. In turn, the bearing support 275 is coupled to the housing 95 by a pin 290 (FIG. 4) received within an elongated aperture of a flange 295 (FIG. 4) that extends radially from the bearing support 275. The pin 290 of the bearing support 275 inhibits the bearing support 275 from rotating about the rotational axis 125 and the central longitudinal axis 230 but allows the bearing support 275 to move relative to the housing 95. For example, the bearing support 275 can pivot about the pin 290 relative to the housing 95 and can translate relative to the pin 290 (e.g., for the pin 290 to move within the elongated aperture of the flange 295). The illustrated bearing support 275 is also coupled to an output member 300 by a joint 305. As the bearing support 275 is inhibited from large angular motion relative to the axes 125, 230 by the pin 290, the output member 300 is also inhibited from large angular motion relative to the axes 125, 230 by the bearing support 275. The output member 300 is driven in a circular motion about the rotational axis 125 with variable radial displacement (e.g., as the output member 300 is driven in the circular motion about the rotational axis 125, the output member 300 moves along an output axis 310 (FIG. 5)). In other words, the output member 300 moves along an output path relative to the housing 95. The output axis 310 is perpendicular to the rotational axis 125 and the central longitudinal axis 230. With continued reference to FIGS. 4 and 5, the illustrated joint 305 includes a concave member 315 coupled to the bearing support 275 that interfaces with a convex member 320 that is coupled to the output member 300. The joint 305 is operable to allow the output member 300 to tilt along an arc generally transverse to the axes 125, 230 and to allow for small angular motion resulting from the circular output of the bearing support 275. As shown in FIG. 2, the output member 300 is fixed to the outer member 76 of the control ring subassembly 75.

In the illustrated embodiment, the first and second electric motors 110, 165 can also function as generators when dynamically braking the ring gear 115 and/or the planetary gear 170. For example, when an angular velocity of the ring gear 115 is desired to be reduced, the first electric motor 110 acts as a generator to slow the angular velocity of the ring gear 115. The captured power from slowing the ring gear 115 can be stored (e.g., within a battery or capacitor) to then be used to operate the first and/or second electric motors 110, 165 (e.g., to increase angular velocities of the first and second electric motors 110, 165 during operation or during startup of the harmonic control actuator 85). Likewise, when an angular velocity of the planetary gear 170 is desired to be reduced, the second electric motor 165 acts as a generator to slow the angular velocity of the planetary gear 170. The captured power from slowing the planetary gear 170 can be stored (e.g., within a battery or capacitor) to then be used to operate the first and/or second electric motors 110, 165 (e.g., to increase angular velocities of the first and second electric motors 110, 165 during operation or during startup of the harmonic control actuator 85). In other embodiments, the captured power from the first and/or second electric motor 110, 165 can be used to power different electrical components of the helicopter 10.

The illustrated harmonic control actuator 85 also includes mechanical brakes 325 coupled to the first and second electric motors 110, 165 (FIG. 3). The brakes 325 are operable to stop rotation of the first and second electric motors 110, 165, which ultimately fixes the output member 300 relative to the housing 95. For example, if power is lost to the first and second electric motors 110, 165, the brakes 325 are operable to lock up the harmonic control actuator Accordingly, the hydraulic servo 90 can provide direct control to the swashplate assembly if the harmonic control actuator 85 loses power.

FIGS. 6A-6C illustrate a first mode of operation of the harmonic control actuator 85. In the first mode of operation, the ring gear 115 and the planetary gear 170 are driven together about/around the rotational axis 125 in a rotational direction 330 at the same angular velocity. In particular, the first electric motor 110 drives the ring gear 115 by the first geartrain 120 about the rotational axis 125 in the rotational direction 330 at a desired angular velocity, and the second electric motor 165 drives the planetary gear 170 by the crankshaft 225 around the rotational axis 125 in the rotational direction 330 at the desired angular velocity. In other words, there is no relative movement of the ring gear 115 and the planetary gear 170 when in the first mode of operation such that a portion 335 of the ring gear 115 is always in engagement with a portion 340 of the planetary gear 170 (FIGS. 6A-6C) while the ring gear 115 and the planetary gear 170 are driven about/around the rotational axis 125. Accordingly, the crankshaft 225 rotates relative to the planetary gear 170 while the ring gear 115 and the planetary gear 170 move together in the rotational direction 330. As shown in FIGS. 6A-6C, the apex axis 265 of the eccentric sleeve 255 is projected onto the planetary gear 170 to be spaced from the rotational axis 125 by an arc distance 345. The arc distance 345 represents the displacement/magnitude of the output member 300 relative to the rotational axis 125 along the output axis 310 while the planetary gear 170 is driven around the rotational axis 125. In the first mode of operation, the arc distance 345 is at its largest and remains constant as the ring gear 115 and the planetary gear 170 rotate together in the rotational direction 330. Accordingly, the eccentric sleeve 255 imparts its largest displacement relative to the rotational axis 125 to the output member 300 to move the output member 300 along the output axis 310. In particular, FIGS. 6A-6C illustrates a sequence of moving the output member 300 via the eccentric sleeve 255 along the output axis 310 between a maximum positive displacement/magnitude (FIG. 6A) to a minimum negative displacement/magnitude (FIG. 6C) relative to the rotational axis 125 during the first mode of operation (e.g., the output member 300 moves at a constant frequency and constant amplitude/magnitude).

FIG. 7 illustrates movement of the output member 300 relative to the rotational axis 125 along the output axis 310 verse time when in the first mode of operation. A first point 350 of FIG. 7 corresponds to the displacement of the output member 300 relative to the rotational axis 125 when the ring gear 115 and the planetary gear 170 are in the position shown in FIG. 6A, a second point 355 of FIG. 7 corresponds to the displacement of the output member 300 relative to the rotational axis 125 when the ring gear 115 and the planetary gear 170 are in the position shown in FIG. 6B, and a third point 360 of FIG. 7 corresponds to the displacement of the output member 300 relative to the rotational axis 125 when the ring gear 115 and the planetary gear 170 are in the position shown in FIG. 6C. As shown in FIG. 7, the output member 300 moves in a sinusoidal manner between the positive maximum displacement and the negative minimum displacement when in the first mode of operation.

As shown in FIG. 7, the harmonic is an n×p signal, where n is the number of blades and p is the rotation speed of the rotor. For example, if the helicopter 10 includes four blades 60 and the rotational speed of the rotor 50 is five hertz, the helicopter 10 will create about 20 hertz in some situations. However, it is understood that aspects of the invention would allow for other order harmonics, and generate multiples of n×p. For instance, for a four bladed aircraft, aspects allow for the reduction of 4p and 8p. For a 5 bladed aircraft, the device could suppress the 5p and 10p harmonics. This is accomplished through oscillating the speed of the first and/or second electric motors 110, 165.

Figure 8A:
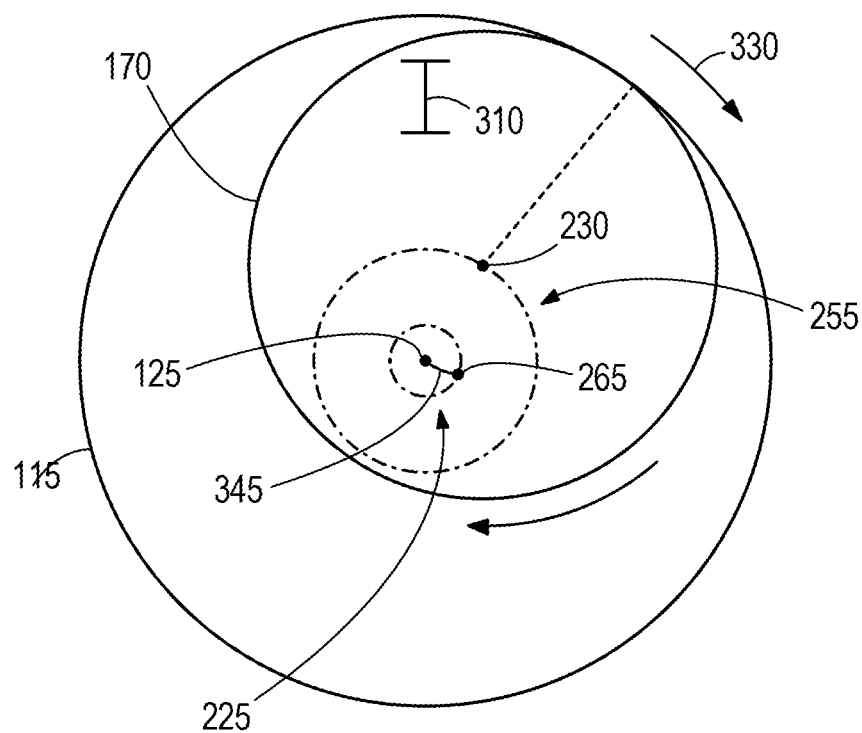
FIGS. 8A and 8B illustrate a sequence of operation of the harmonic control actuator of FIG. 3 when the harmonic control actuator is in a second mode of operation.
Figure 8B:
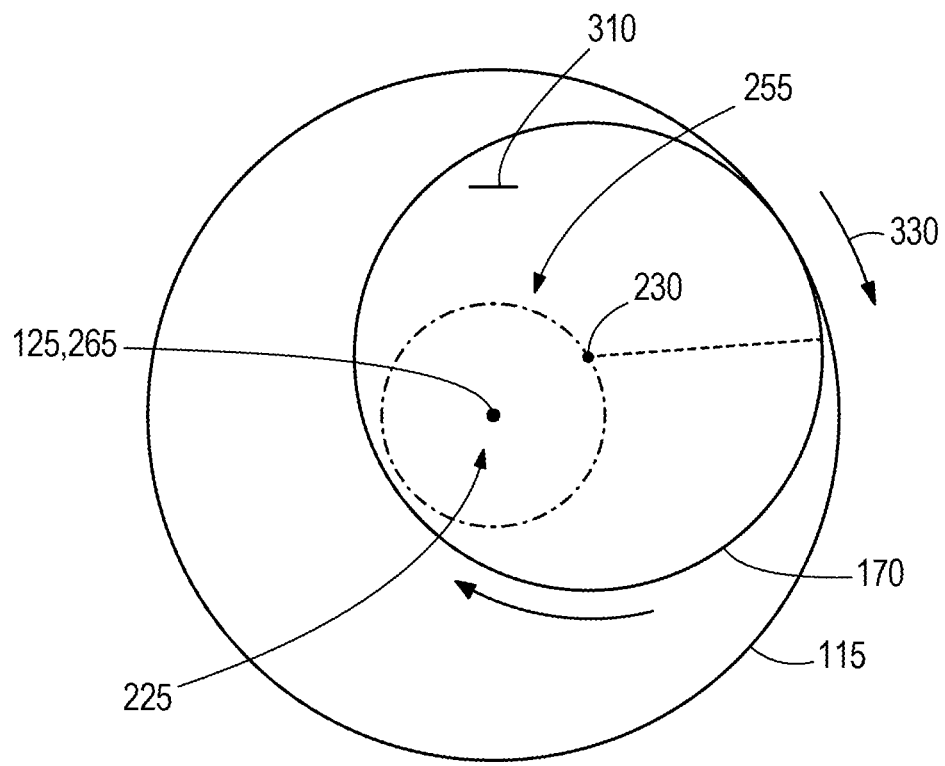
Figure 9:
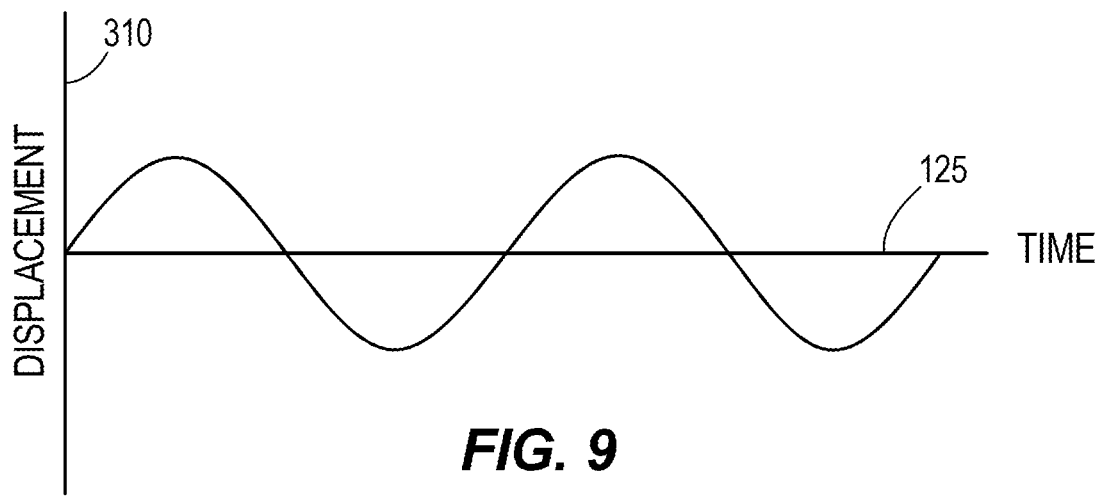
FIG. 9 illustrates an output displacement of the harmonic control actuator when in the second mode of operation shown in FIG. 8A.

FIGS. 8A and 8B illustrate a second mode of operation of the harmonic control actuator 85. In the second mode of operation, the ring gear 115 and the planetary gear 170 are driven about/around the rotational axis 125 in the rotational direction 330 at different angular velocities to change the amplitude of displacement of the output member 300 relative to the rotational axis 125 along the output axis 310. In other words, the second mode of operation includes the ability to vary the output magnitude of the output member 300 along the output axis 310. FIG. 8A illustrates the ring gear 115 rotating about the rotational axis 125 at a first desired angular velocity and the planetary gear 170 rotating around the rotational axis 125 at a second desired angular velocity different than the first angular velocity. Specifically, the first electric motor 110 drives the ring gear 115 by the first geartrain 120 about the rotational axis 125 in the rotational direction 330 at the first desired angular velocity, and the second electric motor 165 drives the planetary gear 170 by the crankshaft 225 around the rotational axis 125 in the rotational direction 330 at the second desired angular velocity. In the illustrated embodiment, the angular velocity of the ring gear 115 about the rotational axis 125 is greater than the angular velocity of the planetary gear 170 around the rotational axis 125. The differential between the angular velocities of the ring gear 115 and the planetary gear 170 decreases the arc distance 345 between the rotational axis 125 and the projected apex axis 265. Accordingly, the magnitude of the positive/negative displacement of the output member 300 along the output axis 310 relative to the rotational axis 125 decreases relative to the first mode of operation, which can lead to the condition shown in FIG. 8B described in detail below. FIG. 9 illustrates the displacement of the output member 300 in the second mode of operation when the first desired angular velocity of the ring gear 115 and the second desired angular velocity of the planetary gear 170 are held constant for a period of time.

Figure 10:
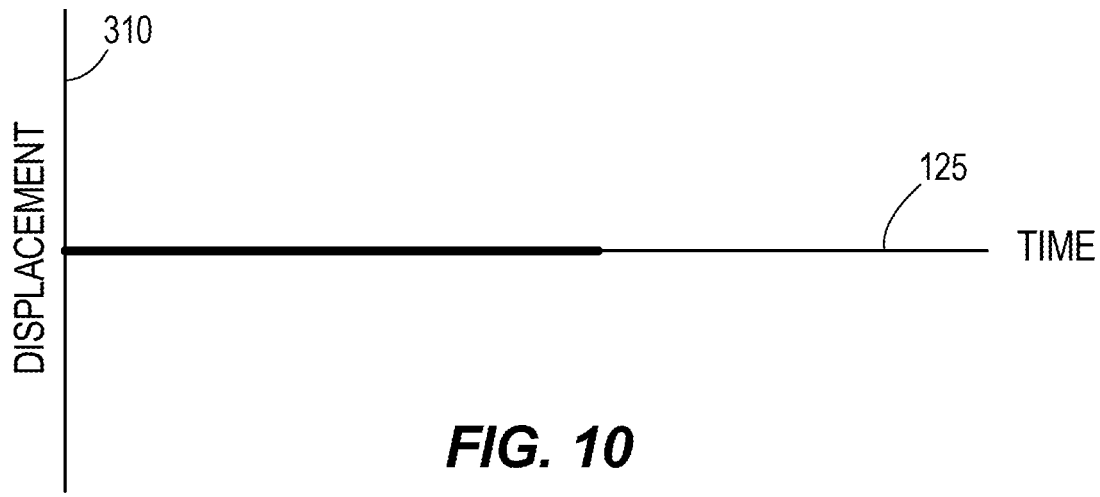
FIG. 10 illustrates an output displacement of the harmonic control actuator when in the second mode of operation shown in FIG. 8B.

FIG. 8B illustrates the ring gear 115 rotating about the rotational axis 125 at the first desired angular velocity and the planetary gear 170 rotating around the rotational axis 125 at a third desired angular velocity different than the first and second angular velocities. In the illustrated embodiment, the third desired angular velocity of the planetary gear 170 is less than the second desired angular velocity of the planetary gear 170 (FIG. 8A). Specifically, the first electric motor 110 drives the ring gear 115 by the first geartrain 120 about the rotational axis 125 in the rotational direction 330 at the first desired angular velocity, and the second electric motor 165 drives the planetary gear 170 by the crankshaft 225 around the rotational axis 125 in the rotational direction 330 at the third desired angular velocity. The differential between the angular velocities of the ring gear 115 and the planetary gear 170 further decreases the arc distance 345 between the rotational axis 125 and the projected apex axis 265. Accordingly, the magnitude of the positive/negative displacement of the output member 300 along the output axis 310 relative to the rotational axis 125 further decreases. Specifically, the differential between the first desired angular velocity of the ring gear 115 and the third desired angular velocity of the planetary gear 170 are such that the planetary gear 170 does not move relative to the rotational axis 125, thus imparting no movement to the output member 300 relative to the rotational axis 125 along the output axis 310. FIG. 10 illustrates the displacement of the output member 300 in the second mode of operation when the desired first angular velocity of the ring gear 115 and the desired third angular velocity of the planetary gear 170 are held constant for a period of time. In some embodiments, FIGS. 8A and 10 illustrate a transient condition of the harmonic control actuator 85. While described in terms of a planetary gear, it is understood that aspects of the invention can be used with other types of gear trains which achieve a speed reduction.

Accordingly, the harmonic control actuator 85 is operable to reciprocate the output member 300 along the output axis 310 relative to the rotational axis 125 between desired positive/negative displacements. The output member 300 can reciprocate to any magnitude between the maximum/minimum displacement shown in FIG. 7 and no displacement as shown in FIG. 10. In addition, the illustrated harmonic control actuator 85 can move between the first mode of operation and the second mode of operation, as well as independently or dependently control the angular velocities of the ring gear 115 and the planetary gear 170 in the rotational direction 330, to produce a desired frequency and magnitude of displacement of the output member 300. In helicopter operation, this condition of virtually zero motion shown in FIG. 10 would be desirable in a hovering condition where, typically, very low or zero vibration can occur thus not requiring a higher harmonic control. Maximum HHC amplitude may be needed in higher speed or maneuvering conditions where ambient vibration can be high.

With reference back to FIGS. 1 and 2, the harmonic control actuators 85 and the hydraulic control servos 90 are in communication with a flight control processor 365. The flight control processor 365 is also in communication with the flight controls 35 (e.g., cyclic control, collective control, etc.) located within the cockpit 40 of the helicopter 10. The illustrated helicopter 10 also includes at least one sensor 370 coupled to the airframe 15 that measures vibrations of the helicopter 10 during flight. In addition, the harmonic control actuators 85 can include sensors in communication with the flight control processor 365 that monitor operating conditions of at least some components of the harmonic control actuators 85. For example, the sensors can measure the actual angular velocities of the first and second electric motors 110, 165 to ensure the first and second electric motors 110, 165 are operating at their desired angular velocity, can measure the actual vertical displacement of the output member 300 along the output axis 310 to ensure the output member 300 is oscillating at the desired magnitude and/or frequency and phase.

During flight of the helicopter 10, the flight controls 35 control the swashplate assembly 70 in a conventional manner. For example, the flight controls 35 control the hydraulic control servos 90 by the flight control processor 365 to move a desired rotor blade(s) 60 about its longitudinal axis 65 to provide directional control to the helicopter 10. In particular, when the swashplate assembly 70 is collectively raised or lowered along the main rotor axis 55 to provide lift or drop to the helicopter 10, the movable pistons 100 of the hydraulic control servos 90 collectively move the swashplate assembly 70 along the main rotor axis 55. The hydraulic control servos 90 collectively move the swashplate assembly 70 by the harmonic control actuators 85 regardless of an operation mode of the harmonic control actuators 85 (e.g., the first mode of operation, the second mode of operation, or if the harmonic control actuators 85 are inoperable). To tilt the helicopter 10 in a desired direction, the flight control processor 365 controls at least one of the movable pistons 100 of the hydraulic control servos 90 to tilt the swashplate assembly 70 in a desired manner. During such movement, the output members 300 of the harmonic control actuators 85 are allowed to pivot and/or tilt relative to their respective housing 95 to accommodate the desired tilt of the swashplate assembly 70.

Also during flight, the helicopter 10 is subjected to vibrations when the helicopter 10 is moving forward, etc. (e.g., non-hovering flight). The illustrated harmonic control actuators 85 are operable to reduce these vibrations during flight thereby providing the pilot with greater control and maneuverability of the helicopter 10 and greater comfort during flight. In particular, the flight control processor 365 receives signals from the sensor 370 corresponding to the vibration frequencies of the airframe 15. The flight control processor 365 then controls the harmonic control actuators 85 to reduce the vibration frequencies of the airframe 15 based on the signals from the sensor 370. In general, the harmonic control actuators 85 oscillate the swashplate assembly 70 relative to the main rotor shaft 50 independently of the hydraulic control servos 90 in a desired manner to oscillate at least one rotor blade 60 about its longitudinal axis 65 to reduce the vibration at chose frequencies of the helicopter 10. For example, if the vibration amplitudes of the helicopter 10 are relatively large, the harmonic control actuators 85 can operate in the first mode of operation (FIG. 7) such that the harmonic control actuators 85 oscillate the swashplate assembly 70 to oscillate each rotor blade 60 about its longitudinal axis 65 between the maximum/minimum magnitudes as shown in FIG. 7. Oscillation of the rotor blades 60 about their longitudinal axes 65 reduces the vibration frequencies of the helicopter 10. If, however, the vibration amplitudes of the helicopter 10 are relatively small, the harmonic control actuators 85 can move into the second mode of operation to decrease the magnitude of oscillation of the rotor blades 60 about their longitudinal axis 65 to the appropriate amount (e.g., FIG. 9) to reduce the smaller vibration amplitudes of the helicopter 10. Alternatively, if the vibration amplitudes are relatively minor or nonexistent, the harmonic control actuators 85 can provide no oscillation to the swashplate assembly 70 (FIG. 10).

Figure 11:
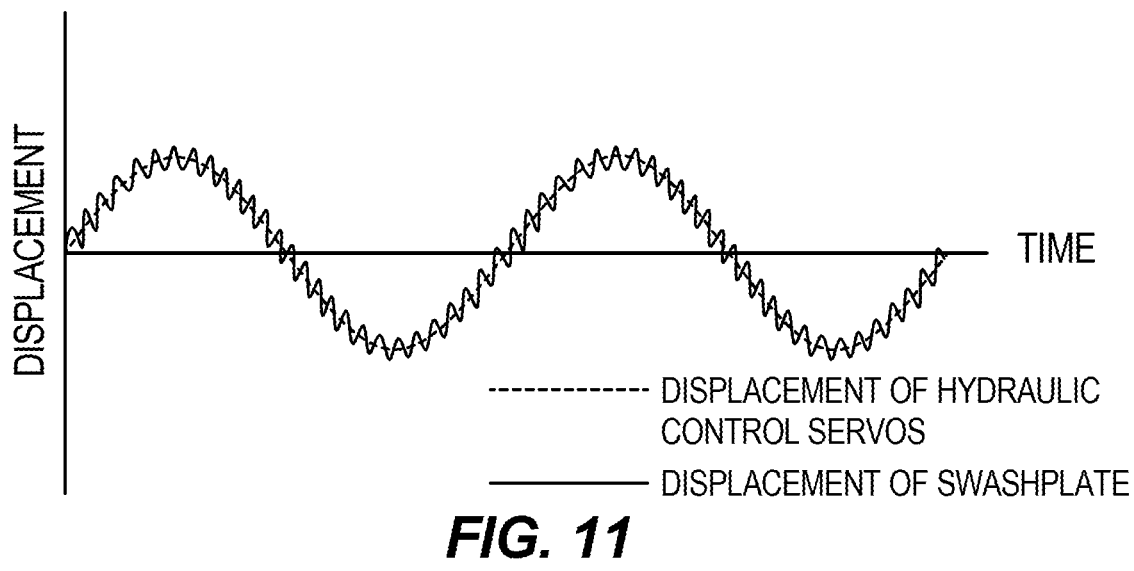
FIG. 11 illustrates an example of output displacements of at least one of the hydraulic control servos of FIG. 2 and at least one of the harmonic control actuators of FIG. 2 during flight of the rotary blade aircraft.

FIG. 11 illustrates an example of when the hydraulic control servos 90 and the harmonic control actuators 85 operate simultaneously. In this example, at least one of the hydraulic control servos 90 is controlled by the flight controls 35 via the flight control processor 365 in a constant sinusoidal manner such that the moveable piston 100 of the hydraulic control servo 90 extends to a maximum positive displacement and retracts to a minimum negative displacement relative to the airframe 15 as shown in broken lines within FIG. 11. This movement of the moveable piston 100 would, for example, create lift and then drop of the helicopter 10 (or vice versa) via the swashplate assembly 70 during flight. At the same instance in time, the flight control processor 365 can control at least one harmonic control actuator 85 based on the signals from the sensor 370 to reduce the vibrations during flight. As such, the output member 300 of the harmonic control actuator 85 can move in a sinusoidal manner along the sinusoidal curve of the moveable piston 100 (FIG. 11). Stated another way, the swashplate assembly 70 is vibrated at a desired frequency and magnitude by the harmonic control actuators 85 relative to the airframe 15 based on the signals from the sensor 370 to reduce vibrations of the helicopter 10 as the hydraulic control servos 90 control movement of the helicopter 10. As stated above, FIG. 11 is simply an example of when the hydraulic control servos 90 and the harmonic control actuators 85 operate simultaneously. In other embodiments, the harmonic control actuators 85 can operate in any desired manner within the maximum and minimum capabilities (e.g., frequency, magnitude, etc.) of the harmonic control actuators 85 while the hydraulic control servos 90 operate in any desired manner within the maximum and minimum capabilities of the hydraulic control servos 90.

At least some of the advantages of the illustrated harmonic control actuators 85 include being electrically operable by the first and second electric motors 110, 165 rather than being hydraulically operable like the hydraulic control servos 90. The first and second electric motors 110, 165 require less power to operate than a hydraulic system operating the harmonic control actuators 85, and the first and second electric motors 110, 165 can function as generators to capture and reuse power. Also, the electrically operable harmonic control actuators 85 avoid any undesired pressure pulsations that could occur if operable by a hydraulic system. Furthermore, the illustrated harmonic control actuators 85 provide reduced complexity to operate and control via the flight control processor 365 than if operable by a hydraulic system.

Various features and advantages of the embodiments described herein are set forth in the following claims.

What is claimed is:
1. A rotary blade aircraft comprising:
an airframe;
a rotor shaft driven about a rotor axis relative to the airframe;
a plurality of rotor blades coupled to the rotor shaft to be driven by the rotor shaft about the rotor axis, each rotor blade having a longitudinal axis;
a swashplate assembly coupled to the plurality of rotor blades, the swashplate assembly operable to move the plurality of rotor blades about the respective longitudinal axis;

a hydraulic control servo coupled between the airframe and the swashplate assembly, the hydraulic control servo operable to move the swashplate assembly relative to the rotor axis; and a harmonic control actuator coupled between the airframe and the swashplate assembly, the harmonic control actuator operable independently relative to the hydraulic control servo to move the swashplate assembly relative to the rotor axis to reduce vibration at selected frequencies in the airframe.

2. The rotary blade aircraft of claim 1, wherein the harmonic control actuator is coupled between the hydraulic control servo and the swashplate assembly.

3. The rotary blade aircraft of claim 1, wherein the harmonic control actuator includes an output member operable to move along an output path to move the swashplate assembly relative to the rotor axis, and wherein the output member is driven by an electric motor.

4. The rotary blade aircraft of claim 3, wherein the electric motor is configured to slow movement of the output member along the output path, and wherein the electric motor is configured to function as a generator to capture energy from the output member slowing along the output path to be stored for further use to at least power the electric motor.

5. The rotary blade aircraft of claim 3, wherein the harmonic control actuator includes a planetary gear and a ring gear, wherein the planetary gear engages the ring gear, wherein the electric motor is coupled to the planetary gear via a first geartrain and a crankshaft, and wherein the electric motor drives the crankshaft via the first geartrain to rotate the planetary gear about a central longitudinal axis of the crankshaft.

6. The rotary blade aircraft of claim 5, wherein the planetary gear includes an eccentric sleeve, wherein the crankshaft extends at least partially through the eccentric sleeve, and wherein the eccentric sleeve is coupled to the output member to reciprocate the output member along the output path.

7. The rotary blade aircraft of claim 6, wherein the electric motor is a first electric motor, wherein the harmonic control actuator includes a second electric motor coupled to the ring gear via a second geartrain, wherein the second electric motor and the second geartrain are operable to rotate the ring gear about a rotational axis of the ring gear, and wherein the rotational axis of the ring gear is spaced from the central longitudinal axis of the crankshaft.

8. The rotary blade aircraft of claim 7, wherein the harmonic control actuator is operable in a first mode of operation including the first electric motor moving the planetary gear around the rotational axis at a first desired angular velocity as the second electric motor moves the ring gear about the rotational axis at the first desired angular velocity to provide a constant amplitude output to the output member.

9. The rotary blade aircraft of claim 8, wherein the harmonic control actuator is operable in a second mode of operation including the first electric motor moving the planetary gear around the rotational axis at a second desired angular velocity as the second electric motor moves the ring gear about the rotational axis at a desired angular velocity different than the second desired angular velocity to provide a variable amplitude output to the output member.

10. The rotary blade aircraft of claim 1, further comprising:

a sensor on the airframe configured to measure vibrations of the airframe during flight; and a control processor coupled to the harmonic control actuator, the control processor configured to receive a signal from the sensor representing measured vibrations of the airframe during flight, determine a desired movement of at least one of the plurality of rotor blades about the respective longitudinal axis based on the signal from the sensor, and control an electric motor of the harmonic control actuator to move the swashplate assembly relative to the rotor axis to provide the desired movement of the at least one of the plurality of rotor blades to reduce the measured vibrations of the airframe.

11. A harmonic control actuator for a rotary blade aircraft, the harmonic control actuator comprising:

a housing;

an electric motor coupled to the housing;

a ring gear supported within the housing;

a planetary gear engageable with the ring gear, the planetary gear including an eccentric sleeve;

a crankshaft at least partially received within the eccentric sleeve, the crankshaft driven by the electric motor to drive the planetary gear; and an output member coupled to the eccentric sleeve to be driven along an output path, the output member configured to move a swashplate assembly of the rotary blade aircraft to reduce vibrations of the rotary blade aircraft during flight.

12. The harmonic control actuator of claim 11, wherein the electric motor is coupled to the planetary gear via a first geartrain and the crankshaft.

13. The harmonic control actuator of claim 12, wherein the electric motor is a first electric motor, wherein the harmonic control actuator further comprises a second electric motor coupled to the ring gear via a second geartrain, wherein the second electric motor and the second geartrain are operable to rotate the ring gear about a rotational axis of the ring gear, and wherein the rotational axis of the ring gear is spaced from a central longitudinal axis of the crankshaft.

14. The harmonic control actuator of claim 11, wherein the electric motor is configured to slow movement of the output member along the output path, and wherein the electric motor is configured to function as a generator to capture energy from the output member slowing along the output path to be stored for further use to at least power the electric motor.

15. The harmonic control actuator of claim 11, further comprising a brake coupled to the electric motor, wherein the brake is actuatable to stop movement of the output member relative to the housing in response to a loss of power to the electric motor.

16. A control assembly configured to reduce vibration at selected frequencies of an aircraft, the control assembly comprising:

a sensor configured to be coupled to an airframe of the aircraft, the sensor configured to measure vibrations of the airframe during flight; and a control processor in communication with the sensor, the control processor configured to receive a signal from the sensor representing measured vibrations of the airframe during flight, determine a desired movement of at least one of a plurality of rotor blades of the aircraft based on the signal from the sensor, and control an electric motor of a harmonic control actuator coupled to a swashplate assembly of the aircraft to provide the desired movement of the at least one of the plurality of rotor blades to reduce the measured vibrations in the airframe.

17. The control assembly of claim 16, wherein the control processor is configured to control the harmonic control actuator in a first mode of operation to provide a constant amplitude output to an output member of the harmonic control actuator.

18. The control assembly of claim 17, wherein the control processor is configured to control the harmonic control actuator in a second mode of operation to provide a variable amplitude output to the output member of the harmonic control actuator.

19. The control assembly of claim 16, wherein the control processor is configured to control the electric motor to slow movement of an output member of the harmonic control actuator along an output path, and wherein the control processor is configured to control the electric motor as a generator to capture energy from the output member slowing along the output path to be stored for further use to at least power the electric motor.

20. The control assembly of claim 16, wherein the control processor is configured to actuate a brake coupled to the electric motor to stop rotation of the electric motor in response to a loss of power to the electric motor.

\* \* \* \* \*